US010530788B1

(12) United States Patent
Kinger et al.

(10) Patent No.: US 10,530,788 B1
(45) Date of Patent: Jan. 7, 2020

(54) DETECTION AND PREVENTION OF MALICIOUS REMOTE FILE OPERATIONS (71) Applicant: Trend Micro Incorporated, Tokyo (JP)

(72) Inventors: Pawan Kinger, Kanata (CA); Nelson William Gamazo Sanchez, Nepean (CA)

(73) Assignee: Trend Micro Incorporated, Tokyo (JP)

( * ) Notice: Subject to any disclaimer, the term of this patent is extended or adjusted under 35 U.S.C. 154(b) by 202 days.

(21) Appl. No.: 15/800,792

(22) Filed: Nov. 1, 2017

(51) Int. Cl.
*H04L 29/06* (2006.01)

(52) U.S. Cl.
CPC ...... *H04L 63/1416* (2013.01); *H04L 63/0428* (2013.01); *H04L 63/1441* (2013.01); *H04L 63/306* (2013.01)

(58) Field of Classification Search
CPC ............... H04L 63/1416; H04L 63/306; H04L 63/1441; H04L 63/0428
USPC .......................................................... 726/23
See application file for complete search history.

(56) References Cited

U.S. PATENT DOCUMENTS

| | | | | |
|---|---|---|---|---|
| 6,981,141 B1* | 12/2005 | Mahne | ..................... | G06F 21/80 713/165 |
| 8,381,303 B2* | 2/2013 | Mahaffey | .............. | G06F 21/564 709/203 |
| 8,627,476 B1* | 1/2014 | Satish | ..................... | G06F 21/51 713/187 |
| 9,047,441 B2* | 6/2015 | Xie | .......................... | G06F 21/00 |
| 9,202,049 B1* | 12/2015 | Book | ....................... | G06F 21/56 |
| 9,292,687 B2* | 3/2016 | Thure | .................... | G06F 21/554 |
| 9,378,364 B1* | 6/2016 | Weast | ...................... | G06F 21/55 |
| 9,594,906 B1* | 3/2017 | Langton | ................ | G06F 21/566 |
| 9,652,615 B1* | 5/2017 | Watson | ................. | G06F 21/562 |
| 2005/0171983 A1* | 8/2005 | Deo | ........................ | G06Q 20/341 |
| 2006/0184798 A1* | 8/2006 | Yaldwyn | ................. | G06F 21/10 713/180 |
| 2007/0250918 A1* | 10/2007 | Aboual Chamat | ......................... | H04L 63/0823 726/5 |
| 2008/0229416 A1* | 9/2008 | Stewart | ................. | G06F 21/566 726/22 |
| 2009/0228533 A1* | 9/2009 | Reddy | ................. | G06F 16/1744 |
| 2009/0271586 A1* | 10/2009 | Shaath | ............... | G06F 12/1466 711/163 |

(Continued)

OTHER PUBLICATIONS

Nolen Scaife, et al. "CryptoLock (and Drop It): Stopping Ransomware Attacks on User Data", 2016, pp. 303-312, IEEE International Conference on Distributed Computing Systems.

(Continued)

*Primary Examiner* — David J Pearson
*Assistant Examiner* — Badridot Champakesanatusptodotgov
(74) *Attorney, Agent, or Firm* — Okamoto & Benedicto LLP (57) ABSTRACT

A detection module monitors, at a network layer, the network traffic between a client computer and a server computer. The detection module extracts application layer data from the network traffic and decodes the application layer data to identify a remote file operation that targets a shared file stored in the server computer. The detection module evaluates the remote file operation to determine if it is a malicious remote file operation. The detection module deems the remote file operation to be malicious when the remote file operation will corrupt the shared file.

14 Claims, 6 Drawing Sheets

(56) References Cited

U.S. PATENT DOCUMENTS

| | | | | |
|---|---|---|---|---|
| 2010/0031358 | A1* | 2/2010 | Elovici | H04L 41/147 |
| | | | | 726/24 |
| 2013/0067576 | A1* | 3/2013 | Niemela | G06F 21/568 |
| | | | | 726/24 |
| 2017/0070506 | A1* | 3/2017 | Reddy | H04L 63/10 |
| 2017/0126708 | A1* | 5/2017 | Eytan | G06F 21/566 |
| 2018/0152465 | A1* | 5/2018 | Levin | H04L 63/1425 |
| 2019/0018962 | A1* | 1/2019 | Desimone | G06F 21/566 |

OTHER PUBLICATIONS

D. Mulders & P. Meessen "Network-based Ransomware Detection", Apr. 13, 2017, pp. 1-42, TUe University of Technology—department of mathematics and computer science.

Two Ways to Stop Ransomware in Its Tracks—MIT Technology Review, Jul. 29, 2016, 6 sheets, retrieved from the internet: https://www.technologyreview.com/s/601943/two-ways-to-stop-ransomware-in-its-tracks/.

Ransomware, Trend Micro, 2 sheets [retrieved on Feb. 13, 2014], retrieved from the internet: http://about-threats.trendmicro.com/us/definition/ransomware/index.html.

Microsoft Malware Protection Center—Ransomware, 3 sheets [retrieved on Feb. 13, 2014], retrieved from the internet: http://www.microsoft.com/security/portal/mmpc/shared/ransomeware.aspx.

Parity bit—from Wikipedia, the free encyclopedia, 7 sheets, page last modified on Apr. 12, 2014, [retrieved on Apr. 15, 2014], retrieved from the internet: http://en.wikipedia.org/wiki/Parity_bit.

* cited by examiner

DETECTION AND PREVENTION OF MALICIOUS REMOTE FILE OPERATIONS

BACKGROUND OF THE INVENTION

1. Field of the Invention

The present invention relates generally to computer security, and more particularly but not exclusively to methods and systems for detecting and preventing malicious remote file operations.

2. Description of the Background Art

Malware, also known as "malicious code," may be used to compromise computer files by corruption, thereby rendering the files inaccessible or otherwise unusable. An example of such malware is the so-called "ransomware", which corrupts a file by encryption, file structure corruption, obfuscation, etc., to make the file unreadable. The infected file, i.e., file corrupted by ransomware, is essentially held hostage, preventing the contents of the file from being read. The ransomware typically demands a ransom to restore an infected file back to its normal/original state. However, there is no guarantee that the infected file will be restored even when the ransom is paid. Also, the infected file may be corrupted to the point of no recovery.

SUMMARY

A detection module monitors, at a network layer, the network traffic between a client computer and a server computer. The detection module extracts application layer data from the network traffic and decodes the application layer data to identify a remote file operation that targets a shared file stored in the server computer. The detection module evaluates the remote file operation to determine if it is a malicious remote file operation. The detection module deems the remote file operation to be malicious when the remote file operation will corrupt the shared file.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

The impact of a ransomware attack is especially devastating in an enterprise computer network because file sharing among users of an enterprise is very prevalent. In an enterprise (e.g., government, university, company, or other organization), several users may share the same file that is stored on a central file server. To access a shared file stored in the data storage of the server, a client computer mounts the data storage of the server as a remote storage, and performs remote file operations (e.g., read and write) on the shared file over the enterprise network by accessing the remote storage.

Due to tighter security on servers in general, the file servers themselves usually do not get infected by malware. The typical infection mechanism in an enterprise environment is usually through a client computer that gets infected and propagates the infection by accessing other computers on the enterprise computer network. In the file server scenario, a ransomware running on a client computer may remotely access and corrupt a shared file stored in the file server. The infection of the shared file typically does not affect the operating system of the file server. In addition, the remote access to the shared file appears to be normal file operations. Accordingly, the security module of the file server may fail to detect and prevent the infection of the shared file.

Traditionally, the security module of the file server includes some form of local disk scanning solution. A disadvantage of this approach is that local disk scanning can only detect and prevent infection caused by malware that is running on the file server itself. In the file server example, the ransomware is running on the client computer, not on the file server. In that example, only the effect of the ransomware is seen on the file server, which is corrupted files. Furthermore, local disk scanning typically does not distinguish network share activity versus normal local disk activity. Increasing the sensitivity of local disk scanning to detect malicious remote file operations would result in high false positive rates, i.e., making normal local file operations appear malicious.

Malicious file-server activity may be monitored to a certain extent to perform behavioral detection based on local disk activity. However, this approach has negative impact on input/output throughput of the file server, and degrades server performance.

Generally speaking, it is difficult to detect the effects of malware when the malware runs on one computer, is not transferred over a computer network, and performs malicious operations on another computer over the computer network.

Figure 1:
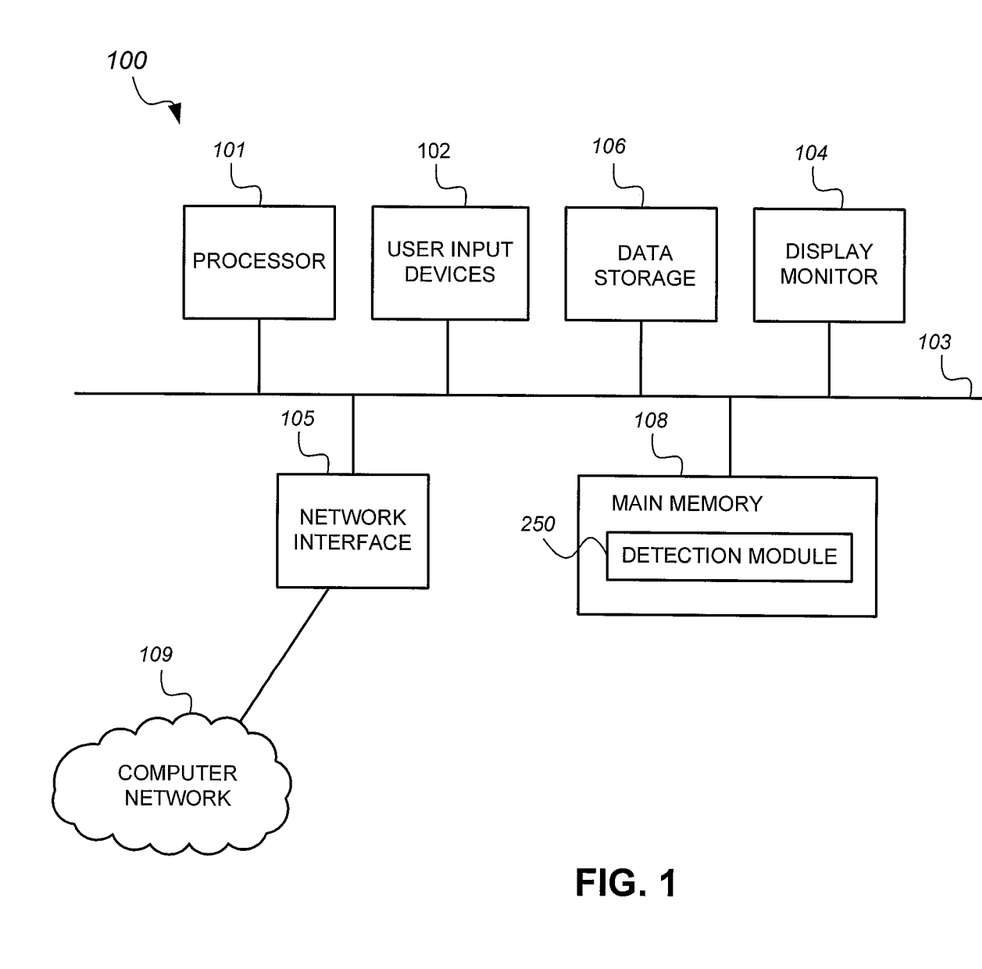
FIG. 1 is a logical block diagram of a computer system in accordance with an embodiment of the present invention

Referring now to FIG. 1, there is shown a logical block diagram of a computer system 100 in accordance with an embodiment of the present invention. The computer system 100 may be employed as an inspection computer or a server computer. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example is the computer network of an enterprise. The computer network 109 may be coupled to the Internet by way of a gateway or other network device (not shown).

The computer system 100 is a particular machine as programmed with one or more software modules, comprising instructions stored non-transitory in the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules. In the example of FIG. 1, the software modules comprise a detection module 250 for detecting and preventing malicious remote file operations.

Figure 2:
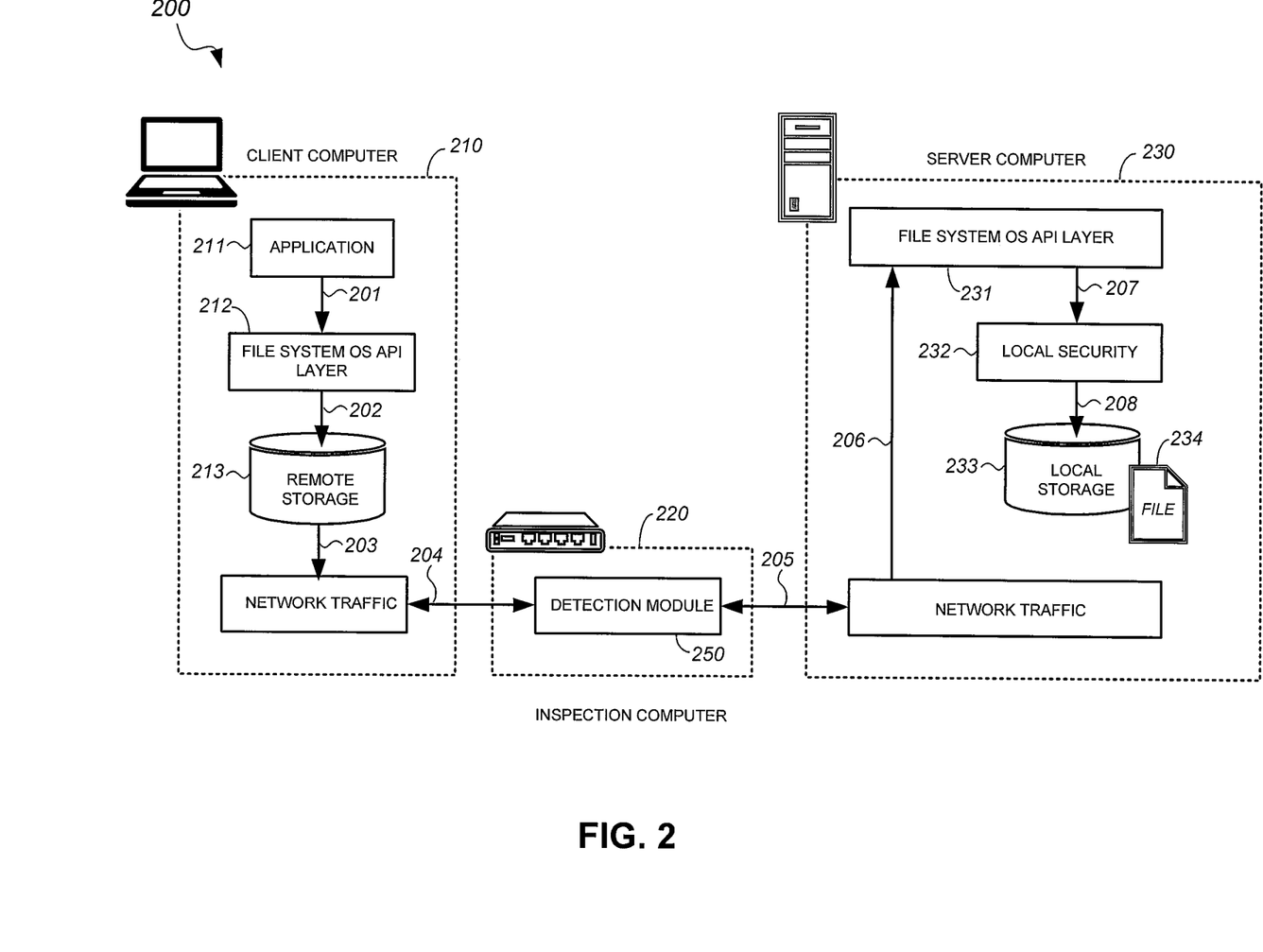
FIG. 2 is a logical block diagram of an enterprise computer network in accordance with an embodiment of the present invention.

FIG. 2 is a logical block diagram of an enterprise computer network 200 in accordance with an embodiment of the present invention. The enterprise computer network 200 may be that of a corporation, government, university, or other group. The enterprise computer network 200 may include a plurality of client computers 210, a plurality of server computers 230, an inspection computer 220, and other network devices (e.g., routers, gateways, etc.). In the example of FIG. 2, only one client computer 210 and one server computer 230 are shown for clarity of illustration.

In one embodiment, a server computer 230 comprises a file system operating system (OS) application programming interface (API) layer 231, a local security module 232, and a local storage 233. The local storage 233 may comprise a hard disk drive, solid-state drive, or other data storage device. The server computer 230 stores one or more computer files 234 in the local storage 233. In one embodiment, the server computer 230 is a file server that allows other computers on the enterprise computer network 200 to access files stored in the local storage 233. A file 234 may be a shared file, i.e., a file shared by a plurality of users of the enterprise.

A client computer 210 may be a user computer or another server computer that remotely accesses a file served by the server computer 230, such as a file 234. In one embodiment, a client computer 210 comprises one or more application programs 211 and a file system OS API layer 212. In one embodiment, the local storage 233 of the server computer 230 is mounted as a remote storage 213 in the client computer 210. File operations performed on the remote storage 213 in the client computer 210 are remote file operations to corresponding files in the local storage 233 of the server computer 230. The client computer 210 performs remote file operations on files stored in the local storage 233 of the server 230 in accordance with a remote file access protocol, which in one embodiment is the Server Message Block (SMB) protocol. As can be appreciated, other remote file access protocols may also be used without detracting from the merit of the present invention.

An inspection computer 220 may be a router, intrusion prevention system, a security appliance, or other computer that performs network traffic inspection. In one embodiment, the inspection computer 220 comprises the detection module 250. The detection module 250 may be implemented in software, hardware, or combination of software and hardware. For example, the detection module 250 may comprise software modules comprising instructions that are executed by the processor of the inspection computer 220. As another example, the detection module 250 may comprise an electrical circuit (e.g., logic gates, field-programmable gate array, application specific integrated circuit, etc.). Yet another example, the detection module 250 may be implemented in firmware.

In an example operation, the local storage 233 of the server computer 230 is mounted on the client computer 210 as the remote storage 213 to allow application programs on the client computer 210 to remotely access the file 234 in accordance with the SMB protocol. A remote file operation (e.g., read or write operation) on the file 234 made by the application program 211 is received by the file system OS API layer 212 of the client computer 210 (see arrow 201), which writes to the remote storage 213 (see arrow 202). The remote file operation is performed with data transmitted as network traffic over the enterprise computer network 200.

In one embodiment, the inspection computer 220 receives and monitors network traffic at the network layer, in accordance with the Open Systems Interconnection (OSI) model. The inspection computer 220 receives the network traffic (see arrow 204), extracts and decodes application layer data from the network traffic to obtain the remote file operation data, scans the remote file operation data to determine if the remote file operation is malicious, and, when the remote file operation is not malicious, forwards the network traffic to the server computer 230 (see arrow 205). In the inspection computer 220, the extraction of application layer data from the network traffic may be performed by an OSI stack or other component (not shown) of the inspection computer 220, and the decoding of the application layer data to obtain the remote file operation data and the scanning of the remote file operation data may be performed by the detection module 250.

The server computer 230 receives the network traffic (see arrow 205), extracts the remote file operation data from the network traffic, and provides the remote file operation data to the file system OS API layer 231 (see arrow 206). The file system OS API layer 231 performs the file operation on the local storage 233 (see arrow 207). The local security module 232 of the server computer 230 intercepts the file operation (see arrow 207), evaluates the file operation, and, when the local security module 232 does not detect that the file operation is malicious, performs the file operation on the local storage 233 (see arrow 208).

Figure 3:
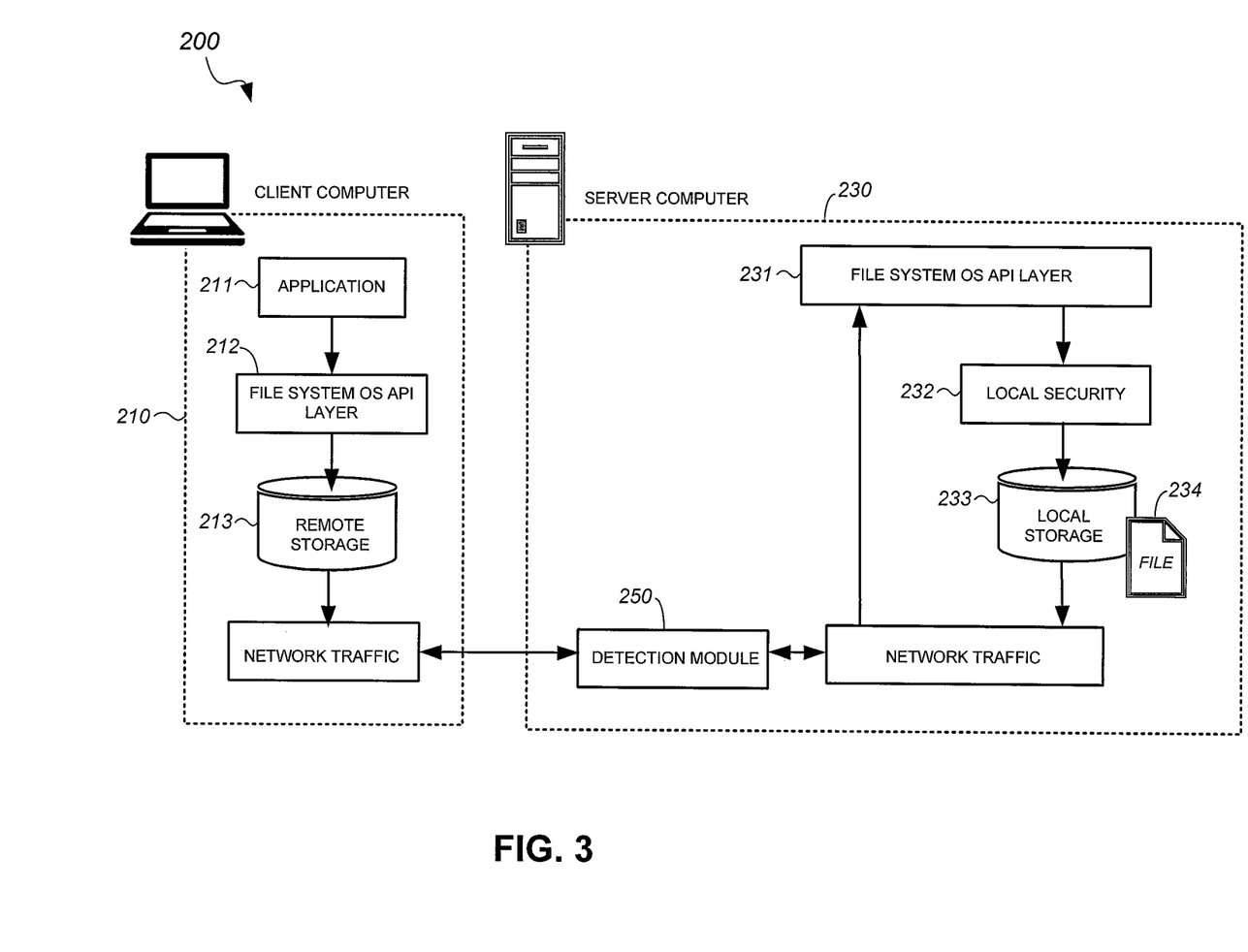
FIG. 3 is a logical block diagram of an enterprise computer network in accordance with another embodiment of the present invention.

As can be appreciated from the foregoing, the detection module 250 may be implemented in another computer other than a dedicated, separate security appliance. This is illustrated in FIG. 3, where the detection module 250 is hosted by the server computer 230, instead of being in a separate inspection computer 220. The operation of the components of the enterprise computer network 200 is otherwise the same in both FIGS. 2 and 3. In other embodiments, the detection module 250 is implemented in a virtual machine, or deployed in a virtual computer network.

Figure 4:
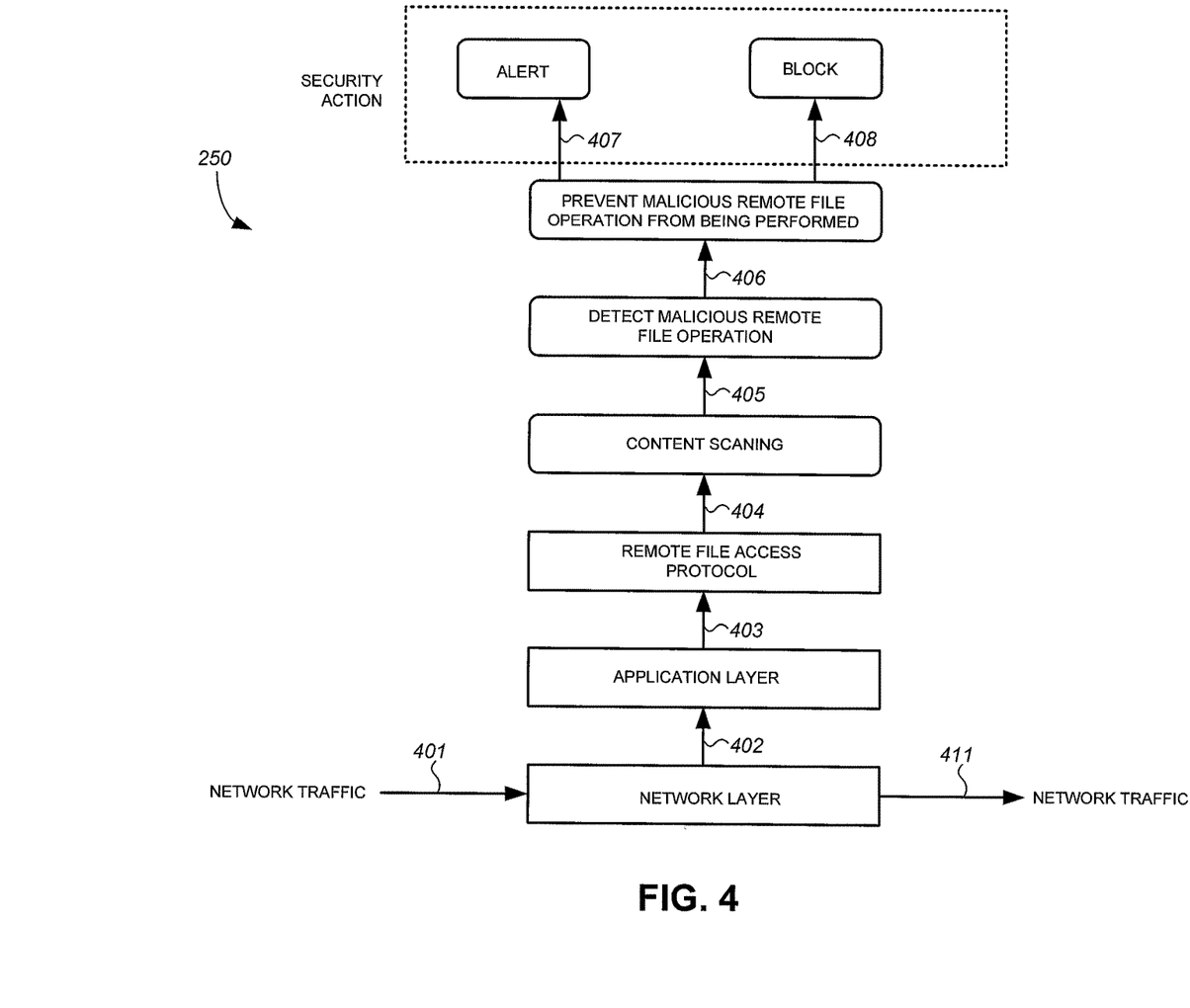
FIG. 4 is a flow diagram of a method of detecting malicious remote file operations in accordance with an embodiment of the present invention.

FIG. 4 is a flow diagram of a method of detecting malicious remote file operations in accordance with an embodiment of the present invention. The method of FIG. 4 is illustrated as being performed by the detection module 250.

In the example of FIG. 4, the detection module 250 receives network traffic that contains remote file operation data. The remote file operation data may be for a remote write operation to overwrite the content of a target shared file, or for a remote write operation to rename the target shared file. The detection module 250 monitors network traffic at the network layer (see arrow 401), extracts application layer data containing the remote file operation data from the network traffic (see arrow 402), and decodes the remote file operation data in accordance with a corresponding remote file access protocol (see arrow 403), which in this example is the SMB protocol.

The detection module 250 scans the remote file operation data to detect a malicious remote file operation (see arrow 404). The detection module 250 may scan the remote file operation data to determine if the remote file operation will corrupt the format of the file targeted by the remote file operation. The detection module 250 may also scan the remote file operation data to determine if the remote file operation will rename the target file to have an extension that is indicative of a ransomware attack. In one embodiment, a remote file operation that corrupts the format of the target file and/or renames the target file to have an extension that is indicative of a ransomware attack is deemed to be a malicious remote file operation.

When the detection module 250 detects that the remote file operation is a malicious remote file operation (see arrow 405), the detection module 250 (or another component) performs a security action to prevent the malicious remote file operation from being performed on the target file (see arrow 406). The security action may include alerting an administrator or user of the enterprise computer network 200 (see arrow 407) and/or blocking the remote file operation (see arrow 408).

When the detection module 250 deems the remote file operation to be a normal (i.e., not malicious) remote file operation, the detection module 250 forwards the network traffic to its destination (see arrow 411). The detection module 250 may hold incoming network traffic in a holding queue, evaluate a copy of the incoming network traffic to detect malicious remote file operations, and release the incoming network traffic from the holding queue when the incoming network traffic is not for a malicious remote file operation.

Figure 5:
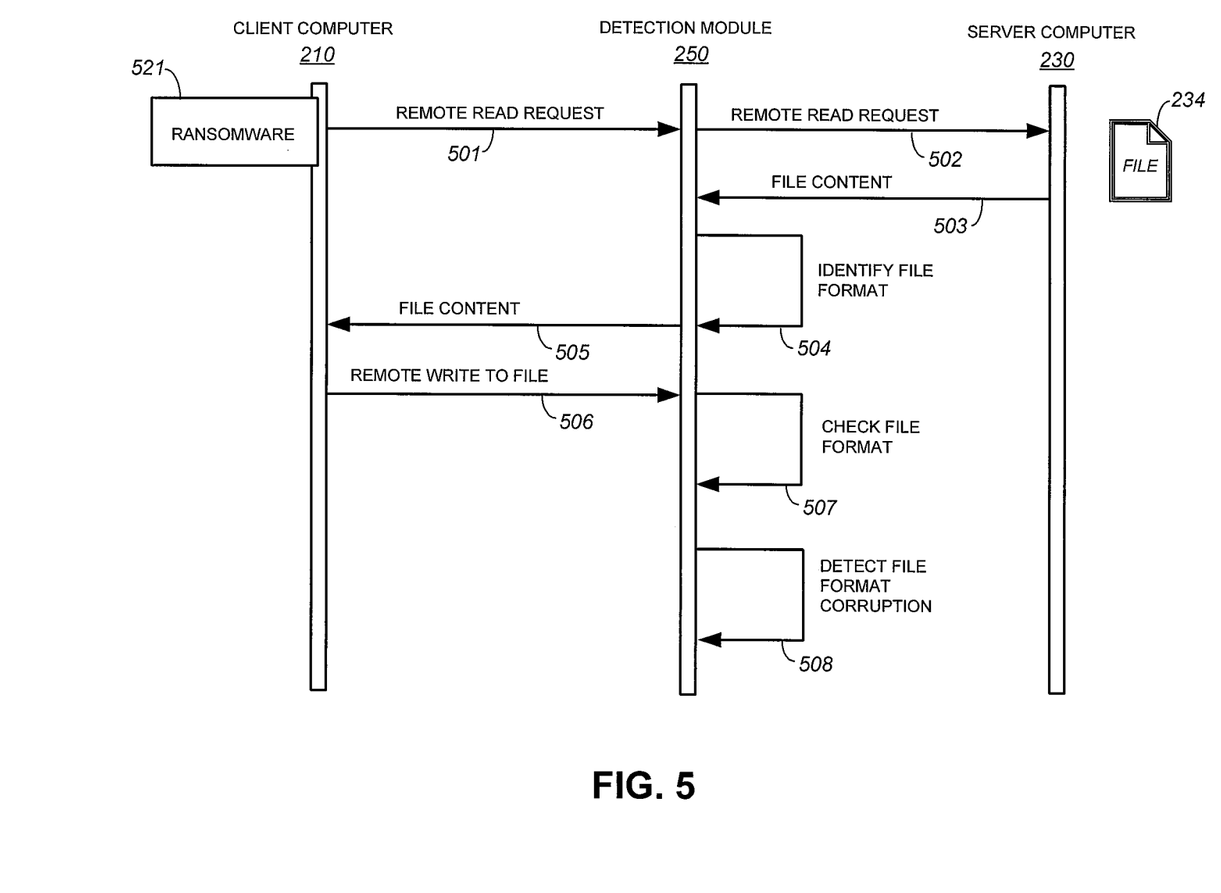
FIG. 5 is a call diagram that illustrates detection of malicious remote file operations in accordance with an embodiment of the present invention.

FIG. 5 is a call diagram that illustrates detection of malicious remote file operations in accordance with an embodiment of the present invention. The call diagram of FIG. 5 is for the case where a ransomware 521 is running on the client computer 210. In the example of FIG. 5, the arrows 501-503, 505, and 506 represent network traffic between the client computer 210 and the server computer 230, which in one embodiment is in accordance with the SMB protocol. The detection module 250 intercepts the network traffic to detect a malicious remote file operation that targets a shared file in the server computer 230.

The content of a file is structured to follow a particular file format, which is defined by a standard for accessibility. Examples of file formats include the Portable Document Format (PDF) file format, Microsoft Word™ document file format, etc. Generally speaking, the ransomware 521 may corrupt the format of a file so that the file will no longer be readable by a corresponding program. For example, the ransomware 521 may corrupt a PDF file such that a PDF reader, or other program, will not be able to properly open and decode its content. The ransomware 521 may corrupt the format of a file by encrypting the content of the file, changing the file format into a structure known only to the cybercriminal who deployed the ransomware 521, obfuscating the file format, etc. In the example of FIG. 5, the detection module 250 monitors the network traffic between the client computer 210 and the server computer 230 to detect remote file operations that will corrupt shared files in the server computer 230.

A remote file operation may be a remote read operation to read a target file, a remote write operation to change the content of the target file, or a remote write operation to rename the target file (also referred to as a "remote rename operation"). In the example of FIG. 5, the ransomware 521 performs a remote read operation to read the content of the file 234. The ransomware 521 initiates the remote read operation by sending a remote read request (see arrow 501) to the server computer 230. The detection module 250 intercepts the network traffic for the remote read operation, extracts and decodes application layer data from the network traffic to detect that it is a remote read request, and forwards the remote read request to the server computer 230 (see arrow 502). In response to the read request, the server computer 230 provides the content of the file 234 to the client computer 210 (see arrow 503).

The detection module 250 intercepts the network traffic containing the content of the file 234 (see arrow 503), extracts and decodes application layer data from the network traffic to find and read the content of the file 234, and identify the format of the file 234 (see arrow 504). The detection module 250 may log the identified format of the file 234 in a database or other listing for subsequent comparison. The detection module 250 forwards the content of the file 234 to the client computer 210 (see arrow 505). It is to be noted that the remote read operation performed by the ransomware 521, by itself, is not a malicious remote file operation. This makes it difficult to detect the ransomware attack targeting the file 234.

The ransomware 521 in the client computer 210 receives the content of the file 234 (see arrow 505) and will corrupt the format of the file by, for example encrypting its content. For example, assuming the file 234 originally has the content, "[START]This is important data[END]", the ransomware 521 may corrupt the file by encrypting its content to, "R237AnB17+afYvsY1NOJHM4K3CL98Az/
 xgjWYVT8fxrWWMg6JxsA==".

Encrypting the content of the file 234 prevents the file 234 from being read by users of the enterprise computer network 200. However, to complete the ransomware attack, the content of the file 234 needs to be overwritten with the encrypted content. Accordingly, the ransomware 521 initiates a remote write operation (see arrow 506) to write the encrypted content to the file 234.

The detection module 250 receives the network traffic for the remote write operation to write to the file 234 (see arrow 506), extracts and decodes application layer data from the network traffic to find the content to be written to the file 234. The detection module 250 checks the resulting format of the file 234 after writing to the file 234 with the encrypted content (see arrow 507). The detection module 250 finds that effecting the remote write operation on the file 234 changes the format of the file 234 such that the file 234 will no longer conform to its previously detected file format standard (see arrow 504). For example, assuming the file 234 conforms to the PDF file format as detected in the previous remote read operation, the file 234 will no longer be readable as a PDF file when the remote write operation is effected on the file 234. Accordingly, the detection module 250 detects that the remote write operation will corrupt the file format of the file 234, and deems the remote write operation to be a malicious remote file operation (see arrow 508). In response to detecting that the remote write operation is a malicious remote file operation, the detection module 250 (or some other component) performs a security action to prevent the remote write operation from being performed on the file 234.

It is to be noted that a remote write operation or a remote read operation, by itself, is not indicative of a malicious remote file operation. This makes it very difficult to protect the server computer 230 from a ransomware attack initiated outside of the server computer 230. However, detecting that a remote write operation corrupts the format of the target file based on information from a previous remote read operation allows the detection module 250 to detect that the remote write operation is malicious. Furthermore, in the context of shared files, encrypting a shared file (e.g., for distribution) typically involves copying the shared file and encrypting the copy. Accordingly, remotely encrypting a shared file at the server computer 230 is highly indicative of a ransomware attack. Advantageously, the detection module 250 can detect and stop the ransomware attack against a file in the server computer 230 even when the ransomware is in another computer.

Figure 6:
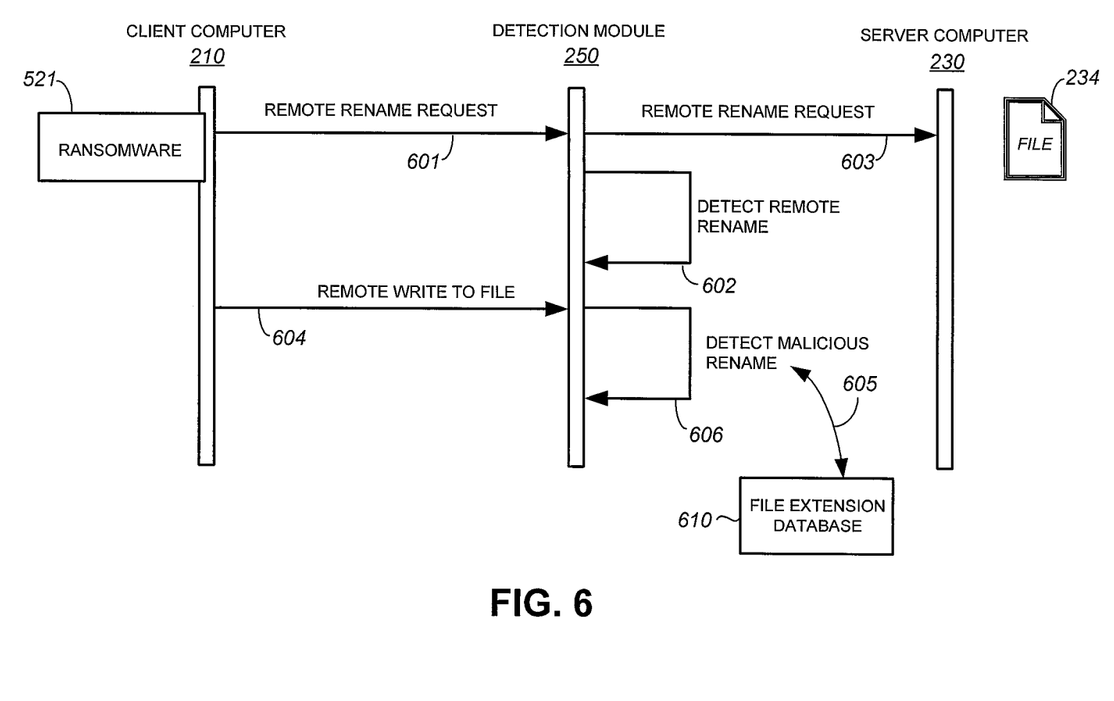
FIG. 6 is a call diagram that illustrates detection of malicious remote file operations in accordance with another embodiment of the present invention.

FIG. 6 is a call diagram that illustrates detection of malicious remote file operations in accordance with an embodiment of the present invention. The call diagram of FIG. 6 is for the case where the ransomware 521 is running on the client computer 210. In the example of FIG. 6, the arrows 601, 603, and 604 represent network traffic between the client computer 210 and the server computer 230, which in one embodiment is in accordance with the SMB protocol. The detection module 250 intercepts the network traffic to detect a malicious remote file operation that targets a shared file in the server computer 230.

A remote rename operation is a remote write operation that involves changing the filename of a file. Generally speaking, the filename of a file includes a dot extension, such as ".txt", ".exe", ".PDF", ".docx", etc., that indicates the file's format. A ransomware attack may involve renaming the corrupted file to a new filename that can identified by the ransomware (or other components associated with the ransomware). For example, assuming the filename of the file 234 is originally, "customer_list.docx", the ransomware 521 may rename the file 234 to have a new filename "customer_list.docx.crypt".

In one embodiment, the detection module 250 includes a database 610 or other listing of known filename extensions that are used by various ransomware in renaming a file. Examples of filename extensions that are indicative of a ransomware attack includes ".crypt", ".fun", ".lck", and ".lock".

In the example of FIG. 6, the ransomware 521 initiates the remote renaming of the file 234 by sending a remote rename request to the server computer 230 (see arrow 601). The detection module 250 intercepts the network traffic for the remote rename operation, extracts and decodes application layer data from the network traffic to detect that it is a remote rename request (see arrow 602), and forwards the remote rename request to the server computer 230 (see arrow 603). The ransomware 521 thereafter initiates a remote write operation to rename the file 234 to a "new filename" (see arrow 604).

The detection module 250 receives the network traffic for the remote write operation to rename the file 234 (see arrow 604), extracts and decodes application layer data from the network traffic to obtain the new filename, and compares the extension of the new filename to filename extensions in the database 610 (see arrow 605). In this example, the new filename has an extension that matches a known filename extension employed in ransomware attacks. Accordingly, the detection module 250 detects the remote rename operation as a malicious remote file operation. In response to detecting that the remote rename operation is a malicious remote file operation, the detection module 250 (or some other component) performs a security action to prevent the malicious remote rename operation from being performed on the file 234.

Methods and systems for detecting malicious remote file operations have been disclosed. While specific embodiments of the present invention have been provided, it is to be understood that these embodiments are for illustration purposes and not limiting. Many additional embodiments will be apparent to persons of ordinary skill in the art reading this disclosure. For example, once a potentially malicious remote file operation is detected, further heuristics, such as checking for frequency of changes, types of files being written or renamed, the extent of the file content change or mismatch, etc., may be taken into account to obtain more certainty in the detection conclusion. Other additional embodiments or modifications are also possible.

What is claimed is:

1. A computer-implemented method comprising:
intercepting a first network traffic transmitted between a client computer and a server computer over a computer network;
extracting a copy of first application layer data from the first network traffic from a network holding queue;
finding from the copy of the first application layer data a remote write operation initiated by an application program in the client computer to write to a shared file stored in the server computer, the shared file being shared by a plurality of users using server message block protocol of the computer network;
detecting that the remote write operation is a malicious remote write operation that will corrupt the shared file by remotely encrypting both format and contents of the shared file, wherein if the remote write operation is performed on the shared file, the format of the shared file will be changed from an original format of the shared file and the contents of the shared file will be changed from original contents to encrypted contents;
and in response to detecting that the remote write operation will corrupt the shared file, initiating a security action to block the remote write operation to prevent the remote write operation from being performed on the shared file.

2. The computer-implemented method of claim 1, wherein detecting that the remote write operation will corrupt the shared file comprises:
intercepting a second network traffic transmitted over the computer network from the server computer to the client computer;
extracting second application layer data from the second network traffic;
finding from the second application layer data the original contents of the shared file;
identifying the original format of the shared file; and
comparing the original format of the shared file to a new format of the shared file if the remote write operation is performed on the shared file.

3. The computer-implemented method of claim 1, wherein intercepting the first network traffic comprises:

receiving the first network traffic in an inspection computer that is separate from the server computer and is configured to monitor network traffic to the server computer at a network layer.

4. The computer-implemented method of claim 1, further comprising:
   intercepting a second network traffic transmitted by the client computer over the computer network;
   extracting second application layer data from the second network traffic;
   finding from the second application layer data that the second network traffic is for a remote read operation to read the shared file; and
   in response to finding that the second network traffic is for the remote read operation to read the shared file, forwarding the second network traffic to the server computer.

5. The computer-implemented method of claim 1, wherein the security action includes sending an alert.

6. A computer system comprising:
   a processor; and
   a memory comprising instructions that when executed by the processor cause the computer system to:
      receive a first network traffic transmitted by a client computer over a computer network;
      extract a copy of first application layer data from the first network traffic from a network holding queue;
      decode the first application layer data to find from the copy of the first application layer data a remote write operation initiated by an application program in the client computer to write to a shared file that is shared by a plurality of users using a server message block protocol of the computer network;
      detect that the remote write operation is a malicious remote write operation that will corrupt the shared file by remotely encrypting both format and contents of the shared file, wherein if the remote write operation is performed on the shared file, the format of the shared file will be changed from an original format of the shared file and the contents of the shared file is changed from original contents to encrypted contents; and
      in response to detecting that the remote write operation will corrupt the shared file, initiate a security action to block the remote write operation to prevent the remote write operation from being performed on the shared file.

7. The computer system of claim 6, wherein the instructions, when executed by the processor, cause the computer system to:
   receive a second network traffic destined for the client computer;
   extract second application layer data from the second network traffic;
   decode the second application layer data to detect the original contents of the shared file;
   identify a format of the shared file; and
   detect that the remote write operation will corrupt the shared file by comparing the original format of the shared file to a new format of the shared file if the remote write operation is performed on the shared file.

8. The computer system of claim 6, wherein the computer system is an inspection computer that is separate from a server computer that stores the shared file.

9. The computer system of claim 8, wherein the server computer is a central file server.

10. The computer system of claim 6, wherein the computer system is configured to store the shared file.

11. The computer system of claim 6, wherein the security action includes blocking the first network traffic.

12. A non-transitory computer-readable medium comprising instructions stored thereon, that when executed by a processor, perform the steps of:
   intercepting a first network traffic transmitted between a client computer and a server computer over a computer network;
   extracting a copy of first application layer data from the first network traffic from a network holding queue;
   finding from the copy of the first application layer data a remote write operation initiated by an application program in the client computer to write to a shared file stored in the server computer, the shared file being shared by a plurality of users using server message block protocol of the computer network;
   detecting that the remote write operation is a malicious remote write operation that will corrupt the shared file by remotely encrypting both format and contents of the shared file, wherein if the remote write operation is performed on the shared file, the format of the shared file will be changed from an original format of the shared file and the contents of the shared file will be changed from original contents to encrypted contents; and in response to detecting that the remote write operation will corrupt the shared file, initiating a security action to block the remote write operation to prevent the remote write operation from being performed on the shared file.

13. The non-transitory computer-readable medium of claim 12, wherein the instructions stored thereon, when executed by the processor, further perform the steps of:
   intercepting a second network traffic transmitted by the client computer over the computer network;
   extracting second application layer data from the second network traffic;
   finding from the second application layer data that the second network traffic is for a remote read operation to read the shared file; and
   in response to finding that the second network traffic is for the remote read operation to read the shared file, forwarding the second network traffic to the server computer.

14. The non-transitory computer-readable medium of claim 12, wherein the security action includes blocking the first network traffic.

* * * * *